United States Patent
Grisar et al.

[11] 3,852,269
[45] Dec. 3, 1974

[54] DIPHENYLALKYLLACTAMIMIDE DERIVATIVES

[75] Inventors: Johann Martin Grisar; Robert Douglas MacKenzie, both of Cincinnati, Ohio

[73] Assignee: Richardson-Merrell Inc., New York, N.Y.

[22] Filed: Apr. 18, 1972

[21] Appl. No.: 245,195

[52] U.S. Cl.... 260/239 B, 260/293.78, 260/326.85, 260/239 A, 424/244, 424/267, 424/274
[51] Int. Cl. ...................... C07d 41/04, C07d 25/00
[58] Field of Search ....... 260/239 A, 239 B, 293.78, 260/326.85

[56] References Cited
UNITED STATES PATENTS
3,378,438    4/1968    Gatzi................................... 260/296

FOREIGN PATENTS OR APPLICATIONS
2,119,163    11/1971    Germany ............................ 260/239

*Primary Examiner*—Harry I. Moatz
*Attorney, Agent, or Firm*—L. Ruth Hattan; Eugene O. Retter; George W. Rauchfuss, Jr.

[57] ABSTRACT

Novel compounds useful in preventing the coagulation of blood are represented by the formula

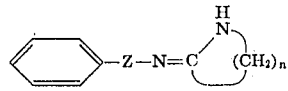

wherein $n$ is a positive whole integer of from 3 to 7; Z represents a straight or branched divalent alkylene chain of from two to six carbon atoms which is substituted with one phenyl radical on any one of the six carbon atoms with the proviso that the alkylene chain carbon atom adjacent to the exocyclic nitrogen must have a least one hydrogen atom attached to it; and pharmaceutically acceptable acid addition salts and individual optical isomers of the compounds where applicable.

10 Claims, No Drawings

DIPHENYLALKYLLACTAMIMIDE DERIVATIVES

FIELD OF INVENTION

This invention relates to novel diphenylalkyllactamimide derivatives useful in preventing the coagulation of blood and to methods of using the compounds.

SUMMARY OF INVENTION

It has been found that diphenylalkyllactamimide derivatives of the following general Formula I and pharmaceutically acceptable acid addition salts and individual optical isomers of the compounds where applicable are useful in preventing the coagulation of blood.

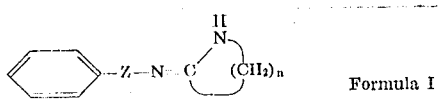

Formula I

In the above general Formula I, $n$ represents a positive whole integer of from 3 to 7 and Z represents a straight or branched divalent alkylene chain of from two to six carbon atoms which is substituted with one phenyl radical on any one of the six carbon atoms with the proviso that the alkylene chain carbon atom adjacent to the exocyclic nitrogen must have at least one hydrogen atom attached to it.

DETAILED DESCRIPTION OF INVENTION

For convenience and uniformity all of the compounds of this invention are named and represented by general Formula I. It is known, however, that compounds of this type as acid addition salts may also be represented by the tautomeric form illustrated by the following Formula II:

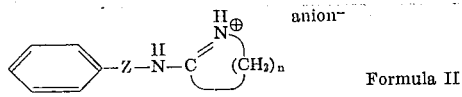

Formula II

This tautomerism has been discussed by R. Kwok and P. Pranc, J. Org. Chem. 32, 740(1967). Structures of Formula II could be named differently. In solution under the conditions of the therapeutic utility, the proportion of each tautomeric form, or the delocalization of the charge between the two nitrogen atoms, will be dependent upon numerous factors including the nature of the substituents; the pH of the medium, and the like. The equilibrium state is conveniently depicted by the following general Formula III:

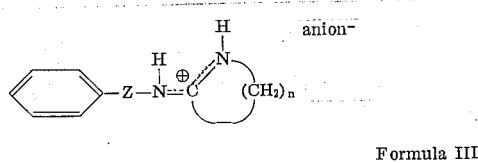

Formula III

In the above general Formulas II and III, $n$ and Z have the meanings defined hereinbefore.

Preferred compounds of this invention may be represented by the following general Formula IV,

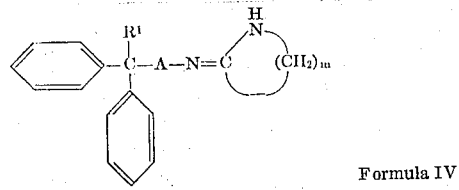

Formula IV wherein $m$ is a positive whole integer of from 3 to 7; $R^1$ represents hydrogen or a straight or branched lower alkyl chain of from one to three carbon atoms; and A represents a straight or branched alkylene chain of from one to two carbon atoms.

As examples of straight or branched phenyl substituted divalent lower alkylene chains that Z represents in general Formulas I to III there may be mentioned, for example, 1-phenyl-1,1-ethylene, 1-phenyl-1,2-ethylene, 3-phenyl-1,3-propylene, 1-phenyl-1,2-propylene, 2-phenyl-1,4-butylene, 3-phenyl-1,5-pentylene, and the like.

As examples of straight or branched divalent alkylene chains that A represents in general Formula IV there may be mentioned, 1,1-methylene, 1,1-ethylene and 1,2-ethylene.

As examples of straight or branched lower alkyl chains that $R^1$ may represent in general Formula IV there may be mentioned methyl, ethyl, n-propyl and isopropyl.

Pharmaceutically acceptable acid addition salts of the base compounds of this invention are those of any suitable inorganic or organic acids. Suitable inorganic acids are for example, hydrochloric, hydrobromic, sulfuric or phosphoric acids and the like. Suitable organic acids are, for example, carboxylic acids such as acetic, propionic, glycolic, lactic, pyruvic, malonic, succinic, furmaic, malic, tartatic, citric, ascorbic, maleic, hydroxymaleic, benzoic, hydroxybenzoic, phenylacetic, cinnamic, salicylic, 2-phenoxybenzoic, and the like, or sulfonic acids such as methane sulfonic, 2-hydroxyethane sulfonic acid and the like.

As examples of compounds of this invention there may be mentioned for example, hexahydro-2-[(β-methyl-β-phenylphenethyl)imino]azepine, 2-[(β-ethyl-β-phenylphenethyl)imino]octahydroazocine hydrochloride maleate, 2-[(1,5-diphenylpentyl)imino]octahydroazonine, 2-[(1,3-diphenylpropyl)imino]piperidine hydrobromide, 2-(2,2-diphenylethylimino)hexahydroazepine hydrochloride, 2-(3,3-diphenylpropylimino)hexahydroazepine, 2-(2,3-diphenylpropylimino)hexahydroazepine, hexahydro-2-[(α-methyl-β-phenylphenethyl)imino]azepine hydrochloride, 2-(1,4-diphenylbutylimino)pyrrolidine, hexahydro-2-[(β-phenyl-β-propylphenethyl)imino]azepine hydrochloride, hexahydro-2-[(β-isopropyl-β-phenylphenethyl)imino]azepine hydrochloride, 2-(α-phenylphenethylimino)pyrrolidine hydrochloride, 2-[(α-methyl-β-phenylphenylpropyl)imino]octahydroazepine, 2-[(β-phenyl-β-propylphenethyl)imino]octahydroazocine acid fumarate, hexahydro-2-[(α-methyl-β-phenyl-β-propylphenethyl)imino]azepine hydrochloride, and the like.

The compounds of this invention including acid addition salts and individual optical isomers where applicable are useful as anticoagulants in that they prevent the coagulation of blood by preventing the aggregation of blood platelets. These novel compounds can be administered to animals, humans, and mammals, either alone or in the form of pharmaceutical preparations which contain the novel compounds suitable for oral or parenteral administration. Pharmaceutical preparations containing novel compounds of this invention and conventional pharmaceutical carriers can be employed in unit dosage forms such as solids, for example, tablets and capsules, or liquid solutions, suspensions or elixirs for oral administration, or liquid solutions, suspensions, emulsions, and the like for parenteral administration. The quality of compound administered can vary over

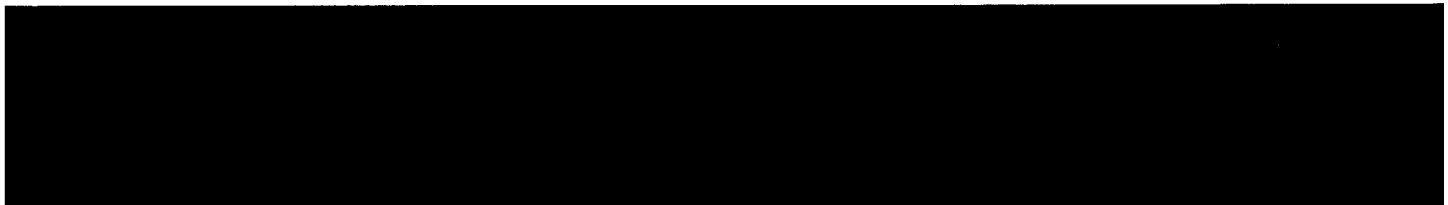

Am. Chem. Soc. 46, 1460 (1924), M. Friefelder et al., J. Org. Chem. 29, 3730 (1964) and L. Birkhofer, Ber. 75, 429 (1942), compounds of this invention containing a pentamethyleneimine moiety may be obtained.

EXAMPLE 1

2-(2,2-Diphenylethylimino)hexahydroazepine hydrochloride

A mixture of 10.8 g of 2,2-diphenylethylamine hydrochloride and 15 ml of O-methylcaprolactim with sufficient absolute ethanol to form a slurry was stirred with cooling then allowed to stand at room temperature for 2 days. The slurry was cooled to about −20° C and the solid was collected air dried, and recyrstallized from methanol-acetone to give the desired product, M.P. 242°–243.5° C.

EXAMPLE 2

2-(3,3-Diphenylpropylimino)hexahydroazepine hydrochloride

By the general procedure of Example 1, only substituting for diphenylethylamine hydrochloride, an appropriate amount of 3,3-diphenylpropylamine hydrochloride, the desired product was obtained, M.P. 239.5°–240.5° C.

EXAMPLE 3

2-(1,2-Diphenylethylimino)hexahydroazepine hydrochloride

To 11.0 g of 1,2-diphenylethylamine was added sufficient O-methylcaprolactim to make a slurry having a total volume of 25 ml. The mixture was allowed to stand for 5 days with occasional stirring and with the addition of about 20 ml of absolute ethanol to maintain a slurry. The slurry was then cooled to −20°C and the solid was collected, dried and recrystallized from methanol-acetone to give the desired product, M.P. 292.5°–294.5° C.

EXAMPLE 4

2-[(β-Phenyl-β-propylphenethyl)imino]piperidine hydrochloride

A mixture of 15 g (0.0545 mole) of β-phenyl-β-propylphenethylamine hydrochloride and 15 ml of O-methylvalerolactim was stirred with cooling until all the amine was dissolved. The mixture was allowed to stand at room temperature for about 5 days during which time a solid formed, and sufficient absolute ethanol was added to maintain the mixture as a slurry. The slurry was then cooled to −20°C after which a solid formed which was collected, washed with ether, air dried and recrystallized from methanol-acetone to give the desired product, M.P. 220.5°–222° C.

EXAMPLE 5

Octahydro-2-[(β-phenyl-β-propylphenethyl)imino] azocine acid fumarate.

A mixture of 15 g (0.0545 mole) of β-phenyl-β-propylphenethylamine hydrochloride and 15 ml of O-methylenantholactim was allowed to stand at room temperature with occasional stirring for about 4 days during which time sufficient absolute ethanol was added to maintain the mixture as a slurry. The slurry was cooled to −20°C, the solid was collected, dried, recrystallized from methanol-acetone, then converted to the free base. The free base was converted to the acid fumarate of the desired product, M.P. 179°–182° C.

EXAMPLE 6

Hexahydro-2-[(α-methyl-β-phenylphenethyl)imino] azepine hydrochloride

A. A mixture of 60 g of 1,1-diphenylacetone and 72 g of ammonium formate was heated slowly to 185° C and was stirred at that temperature for 6 hours while allowing the distillate to collect in a receiver. Water was then added and the mixture was allowed to stand overnight. The aqueous phase (containing excess ammonium formate) was decanted and to the residual oil was added 150 ml of concentrated hydrochloric acid. The mixture was heated on a steam bath for 2 hours and the solid that separated on cooling was collected. Washing with benzene removed unreacted starting material and the remaining solid was recrystallized from isopropanol to give α-methyl-β-phenylphenethylamine hydrochloride, M.P. 281°–283° C (dec.).

B. By the general procedure of Example 1 only substituting for 2,2-diphenylethylamine hydrochloride an appropriate amount of α-methyl-β-phenylphenethylamine and allowing the mixture to stand at room temperature for 3 days the desired product was obtained, M.P. 291°–292° C.

EXAMPLE 7

Hexahydro-2-[(β-phenyl-β-propylphenethyl)imino] azepine hydrochloride

A. To 16.1 g (0.425 mole) of LiAlH$_4$ under 2.5 liters of anhydrous ether was added dropwise over 1.5 hours 100 g (0.425 mole) of 2,2-diphenylvaleronitrile and the mixture was refluxed with stirring overnight. Excess reagent was decomposed by careful addition of 16.1 ml of water, 16.1 ml of 15% NaOH and 48.3 ml of water over several hours. The resulting precipitate of inorganic material was removed by filtration. The product was extracted from the filtrate with 2N HCl, the aqueous phase was made alkaline with 2N NaOH and the product was extracted into ether and dried over Na$_2$SO$_4$. The hydrochloride salt of β-phenyl-β-propylphenethylamine was precipitated by adding gaseous HCl and was recrystallized twice from isopropanol-water to give 68.8 g (59 percent) of β-phenyl-l-β-propylphenethylamine, M.P. 208°–210° C.

B. By the general procedure of Example 1 only substituting for 2,2-diphenylethylamine hydrochloride, an appropriate amount of β-phenyl-β-propylphenethylamine hydrochloride and allowing the mixture to stand at room temperature for about 3 days, the desired product was obtained, M.P. 238°–240° C.

EXAMPLE 8

2-[(α,β-Dimethyl-β-phenylphenethyl)imino]hexahydroazepine hydrochloride

By the general procedure of Example 1 only substituting for 2,2-diphenylethylamine hydrochloride, an appropriate amount of α,β-dimethyl-β-phenylphenethylamine hydrochloride and allowing the mixture to stand at room temperature for 24 days, the desired product was obtained, M.P. 252°–254° C (dec.).

EXAMPLE 9

By the general procedure of Example 1 only substituting for 2,2-diphenylethylamine hydrochloride an appropriate amount of β-methyl-β- phenylphenethylamine hydrochloride, β-ethyl-α-phenylphenethylamine hydrochloride, and 1,5-diphenylpentylamine hydrochloride, the following products are obtained respectively:

hexahydro-2-[(β-methyl-β-phenylphenethyl)imino]azepine hydrochloride

2-[(β-ethyl-α-phenylphenethyl)imino]hexahydroazepine hydrochloride, 2-(1,5-diphenylpentylimino)hexahydroazepine hydrochloride.

EXAMPLE 10

2-{[(α-Methyl-β-phenyl-β-propyl)phenethyl]imino}hexahydroazepine hydrochloride

By the general procedure of Example 1 only substituting for 2,2-diphenylethylamine hydrochloride an appropriate amount of α-methyl-β-phenyl-β-propylphenethylamine hydrochloride and allowing the mixture to stand at room temperature, the desired product is obtained.

EXAMPLE 11

An illustrative composition for tablets is the following:

|   |   | Per Tablet |
|---|---|---|
| (a) | hexahydro-2-(2,2-diphenylethylimino)azepine hydrochloride | 100.0 mg |
| (b) | wheat starch | 15.0 mg |
| (c) | lactose | 33.5 mg |
| (d) | magnesium stearate | 1.5 mg |

A portion of the wheat starch is used to make a granulated starch paste which together with the remainder of the wheat starch and the lactose is granulated, screened and mixed with the active ingredient, that is, (a), and the magnesium stearate. The mixture is compressed into tablets weighing 150 mg each.

EXAMPLE 12

An illustrative composition for hard gelatin capsules is as follows:

|   |   | Per Capsule |
|---|---|---|
| (a) | hexahydro-2-(1,2-diphenylethylimino)azepine hydrochloride | 200.0 mg |
| (b) | talc | 35.0 mg |

The composition is prepared by passing the dry powders of (a) and (b) through a fine mesh screen and mixing them well. The powder is then filled into No. 0 hard gelatin capsules at a net fill of 235 mg per capsule.

EXAMPLE 13

An illustrative composition for a parenteral injection is the following wherein the quantities are on a weight to volume basis.

|   |   | Amount |
|---|---|---|
| (a) | 2-[(β-phenyl-β-propylphenethyl)imino]piperidine hydrochloride | 100.0 mg |
| (b) | sodium chloride | q.s. |
| (c) | water for injection to make | 10.0 ml |

The composition is prepared by dissolving the active ingredient, that is (a) and sufficient sodium chloride in water for injection to render the solution isotonic. The composition may be dispensed for multiple or single dosage forms.

We claim:

1. A compound selected from a base of the formula

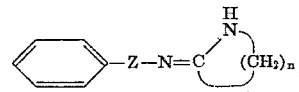

wherein $n$ is a positive whole integer of from 3 to 7; Z is selected from the group consisting of a straight or branched divalent alkylene chain of from two to six carbon atoms wherein any one of the carbon atoms one through six of said alkylene chain is substituted with one phenyl radical with the proviso that the alkylene chain carbon atom adjacent to the exocyclic nitrogen has at least one hydrogen atom attached to it; and pharmaceutically acceptable acid addition salts thereof.

2. A compound selected from a base of the formula

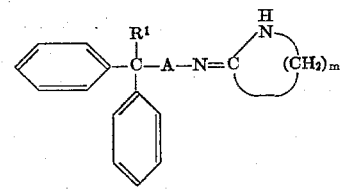

wherein $m$ is a positive whole integer of from 3 to 7; $R^1$ is selected from the group consisting of hydrogen or a straight or branched lower alkyl chain of from one to three carbon atoms; A is selected from the group consisting of a straight or branched alkylene chain of from one to two carbon atoms; and pharmaceutically acceptable acid addition salts thereof.

3. A compound of claim 2 which is 2-[(β-phenyl-β-propylphenethyl)imino]piperidine and pharmaceutically acceptable acid addition salts thereof.

4. A compound of claim 2 which is 2-[(β-phenyl-β-propylphenethyl)imino]octahydroazocine and pharmaceutically acceptable acid addition salts thereof.

5. A compound of claim 2 wherein $m$ is the integer 5.

6. A compound of claim 5 which is hexahydro-2-(2,2-diphenylethylimino)azepine and pharmaceutically acceptable acid addition salts thereof.

7. A compound of claim 5 which is hexahydro-2-(3,3-diphenylpropylimino)azepine and pharmaceutically acceptable acid addition salts thereof.

8. A compound of claim 5 which is hexahydro-2-[(α-methyl-β-phenylphenethyl)imino]azepine and pharmaceutically acceptable acid addition salts thereof.

9. A compound of claim 5 which is hexahydro-2-[(β-phenyl-β-propylphenethyl)imino]azepine and pharmaceutically acceptable acid addition salts thereof.

10. A compound of claim 5 which is 2-[(α,β-dimethyl-β-phenylphenethyl)imino]hexahydroazepine and pharmaceutically acceptable acid addition salts thereof.

* * * * *